United States Patent
Stefansson et al.

[15] 3,673,602
[45] June 27, 1972

[54] OSCILLOGRAPH RECORD IDENTIFICATION APPARATUS

[72] Inventors: Rafn Stefansson, San Marino; Robert A. Beanston, Arcadia, both of Calif.

[73] Assignee: Bell & Howell Company, Chicago, Ill.

[22] Filed: July 30, 1970

[21] Appl. No.: 59,436

[52] U.S. Cl. ............................346/107 A, 95/1.1, 346/109
[51] Int. Cl. .......................................................G01d 13/00
[58] Field of Search.......................346/109, 107, 23, 49, 45; 95/1.1

[56] References Cited

UNITED STATES PATENTS

| | | | |
|---|---|---|---|
| 3,187,336 | 6/1965 | Montgomery | 346/109 |
| 3,333,276 | 7/1967 | Sihvonen | 346/107 |

Primary Examiner—Joseph W. Hartary
Attorney—David Weiss

[57] ABSTRACT

In a recording oscillograph, apparatus for automatically recording on the oscillograph paper, and simultaneously with the recording thereon of one or more galvanometer traces, an indication of a selected control setting of an adjustable operative condition of the oscillograph. In an oscillograph which is provided with apparatus for applying timing lines on the moving paper, a preferred embodiment includes transparent indicia corresponding to various timing line intervals serially arranged in an opaque member, and a shutter member is driven in a light path synchronously with the driven opaque member such that only one of the timing indicia is projected onto the moving paper during a revolution of the opaque member, while preventing the projection of the others of the timing indicia during that cycle. Means responsively connected to the timing line control means automatically adjusts the phase relationship of the rotating shutter with respect to the rotating opaque member, so that the projected one of the timing indicia corresponds to the selected setting of the timing line control means.

6 Claims, 6 Drawing Figures

Rafn Stefansson,
Robert A. Beanston,
INVENTORS.
BY.

David Weiss
ATTORNEY.

Rafn Stefansson,
Robert A. Beanston,
INVENTORS.
BY.

*David Weiss*

ATTORNEY.

OSCILLOGRAPH RECORD IDENTIFICATION APPARATUS

BACKGROUND OF THE INVENTION

1. Field of the Invention

This invention relates to oscillographs, and more particularly to apparatus for automatically recording on the oscillograph record medium an indication of a selected control setting of an adjustable operative condition of the oscillograph.

2. Description of the Prior Art

A recording oscillograph includes at least one galvanometer for transducing an electrical signal into deflection of a light beam. A record medium, such as a photosensitive surface of a recording paper, is driven to move past the light beam such that a galvanometer trace is exposed thereon, the trace exhibiting deflection perpendicular to the direction of paper movement and proportional to the instantaneous values of the electrical data signal. The recorded trace is commonly called an oscillogram.

Modern oscillographs are equipped with a variety of devices each including a control for adjusting an operative condition of the oscillograph. When these operative conditions affect calibration of the oscillogram, it is important to maintain a record of the status of these conditions and to refer the oscillogram thereto.

Paper speed and system voltage sensitivity, for example, are two operative conditions of many oscillographs which can be varied for producing an oscillogram most suited to the characteristics of a particular data signal. Adjustment of the paper speed affects the time calibration of the oscillogram, whereas adjustment of galvanometer driver amplifier attenuation (voltage sensitivity) affects the oscillogram's amplitude calibration with respect to data signal magnitude.

Maintaining a time-related record on the oscillograph is generally accomplished by providing the oscillograph with apparatus for producing "timing lines" on the paper, i.e., a series of parallel lines across the paper (perpendicular to the direction of paper movement) printed simultaneously with the oscillographic recording of data, a predetermined time interval elapsing between the recording of succeeding lines. From the distance spacing between these timing lines and a knowledge of the time interval between lines, the oscillogram's time ordinate can be determined.

For oscillographs of the prior art capable of recording timing lines at more than one time interval, particularly when various paper speeds can be provided, it is impossible to determine the time interval between lines from an examination of the line pattern. For example, a timing line pattern produced at a paper speed of 1 inch per second and a timing line frequency of 10 lines per second would have the identical appearance as a pattern produced at a paper speed of 10 inches per second and a timing line frequency of 100 lines per second, although the lines were recorded at time intervals of 0.1 and 0.01 second respectively.

A record of the time interval between timing lines is typically maintained by an operator who manually records an indication of the timing line interval (or line frequency) on the oscillograph paper at the conclusion of the acquisition of data. Alternatively, and by necessity when closed magazine or remote recording is employed, the operator logs the timing information in a notebook for subsequent transfer onto the oscillograph paper.

SUMMARY OF THE INVENTION

By the present invention, apparatus is provided for automatically recording on the oscillograph paper, and simultaneously with the recording thereon of one or more galvanometer traces, an indication of a selected control setting of an adjustable operative condition of the oscillograph. Means operatively connected to the paper drive means is provided for applying indicia indicative of the various control settings on the oscillograph paper, together with interrupter means operatively connected to the oscillograph's paper drive means for interrupting the application of all but one of these indicia. Means responsively connected to the control means synchronizes the interrupter means with the application means such that only such indicia which are indicative of the selected control setting are applied to the oscillograph paper.

The application means can comprise a modification of indicia projection systems, well-known to the oscillographic art, for identifiably distinguishing among a plurality of simultaneously recorded galvanometer traces. Such projection systems are described in U.S. Pat. Nos. 3,081,458 and 3,146,664, and include an opaque member having thereon a series of transparent trace numbering indicia which are sequentially projected adjacent to an edge of the moving paper.

The present modification of these trace identification projection systems comprises the inclusion in the opaque member of transparent indicia corresponding to the various control settings. The opaque member (which can be a disk or a continuous band) is rotatably driven by the oscillograph paper drive means such that the trace identification numbers and the control setting indicia are serially interposed in the light path, once each revolution of the opaque member, for projection of corresponding images thereof on the moving photosensitive paper.

The invention further includes a light control means for controlling the times when light is projected along the light path to coincide with the interposition of a selected control setting indicium in the light path. In a preferred embodiment of the record identification system of the present invention, the light control means includes a shutter arrangement for interrupting the light path when a control setting indicium which does not correspond to the selected control setting is interposed in the light path, but does not interrupt the light path during times when a trace identification number or the indicium corresponding to the selected control setting is interposed in the light path.

The preferred embodiment automatically records—on the oscillograph paper adjacent to an edge thereof—an indication of the time interval occurring between recorded timing lines. Transparent indicia corresponding to the various timing line intervals are serially arranged in the opaque member, and the shutter arrangement includes a shutter member which is rotatably driven synchronously with the opaque member. The shutter member includes an opening therein for permitting one of the timing indicia to be projected onto the moving paper during a revolution of the opaque member, while preventing the projection of the others of the timing indicia during that cycle. Means responsively connected to the timing line control means automatically adjusts the phase relationship of the rotating shutter with respect to the rotating opaque member, so that the projected one of the timing indicia corresponds to the selected setting of the timing control.

BRIEF DESCRIPTION OF THE DRAWINGS

The novel features which are believed to be characteristic of the invention, together with further advantages thereof, will be better understood from the following description considered in connection with accompanying drawings in which a preferred embodiment of the invention is illustrated by way of example. It is to be expressly understood, however, that the drawings are for the purpose of illustration and description only, and are not intended as a definition of the limits of the invention.

DESCRIPTION OF THE PREFERRED EMBODIMENT

Figure 1:
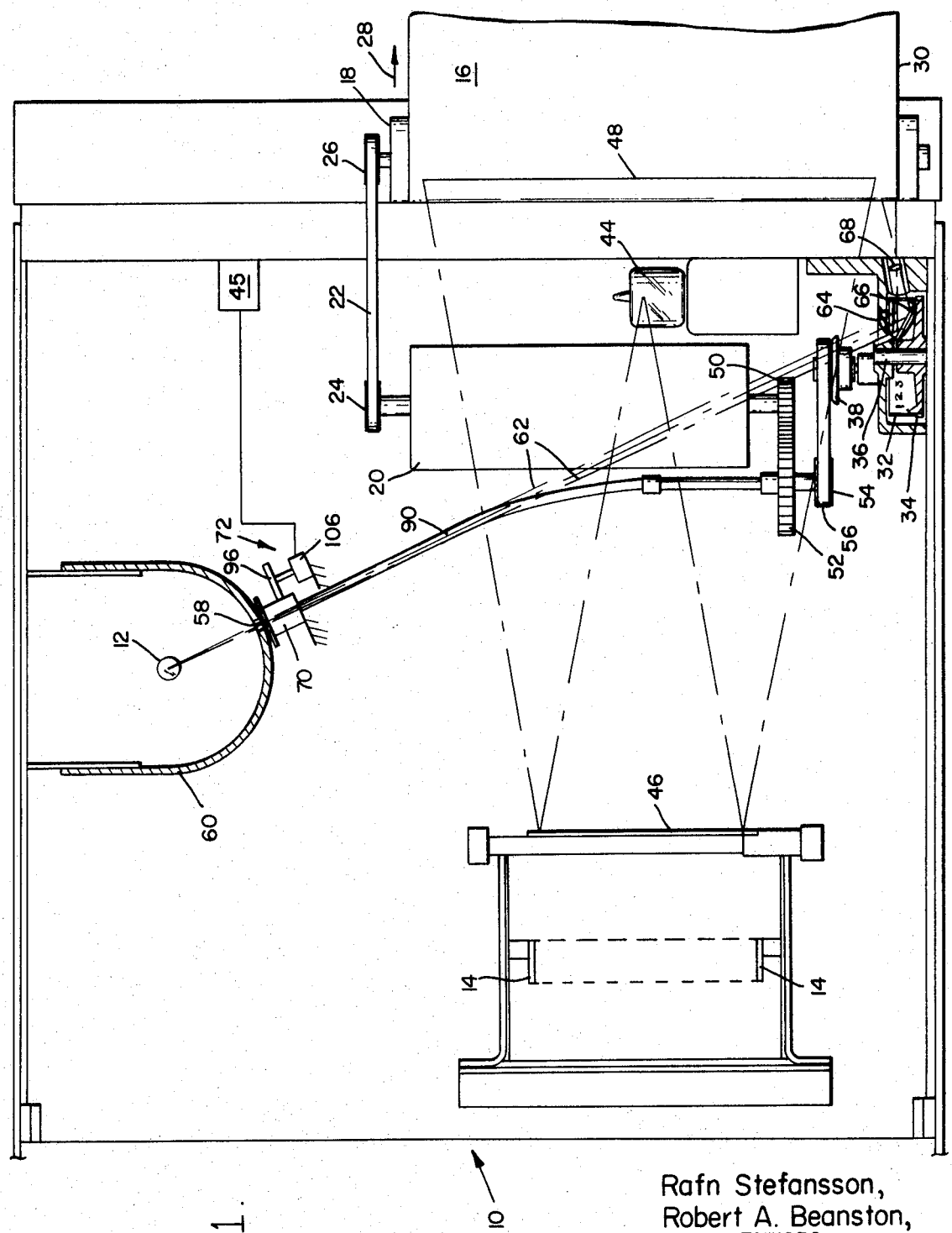
FIG. 1 is a partial sectional plan view of a recording oscillograph which includes a preferred embodiment of a control setting identification apparatus, shown partly in block form, in accordance with the present invention.

Turning first to FIG. 1, a multiple recording oscillograph 10 is shown, for projecting respective light beam traces from a plurality of galvanometers 14 onto a moving photosensitive medium 16. The photosensitive medium 16 is typically an oscillograph paper having a photosensitive surface upon which darkened markings are produced on portions of the surface exposed to light. The paper 16 is commonly driven by a metering roller 18 from a supply roll (not shown), the metering roller 18 rotatably driven by a paper drive motor 20 through a transmission such as a drive belt 22 coupling a motor driven pulley 24 and a metering drive pulley 26. The paper drive motor 20 can be controlled to operate at any of a plurality of speeds, so that the paper 16 can be driven at various speeds in the direction (for the purpose of illustration) of arrow 28.

The oscillograph 10 is provided with an indicia application apparatus for applying pertinent indicia adjacent to an edge 30 of the photosensitive paper 16. For example, projection systems for applying indicia corresponding to respective galvanometer traces simultaneously recorded on the paper 16 are a well-known to the oscillographic art, such as the projection systems described in U.S. Pat. Nos. 3,081,458 and 3,146,664, as previously noted.

In one type of indicia projection system useful for oscillogram identification, an opaque film strip 32 is encircled upon and supported by a film strip drive gear 34 which is caused to be rotatably driven abut a shaft 36 by means of a pinion gear (not shown) which in turn is driven by a pulley 38.

Figures 2, 6:
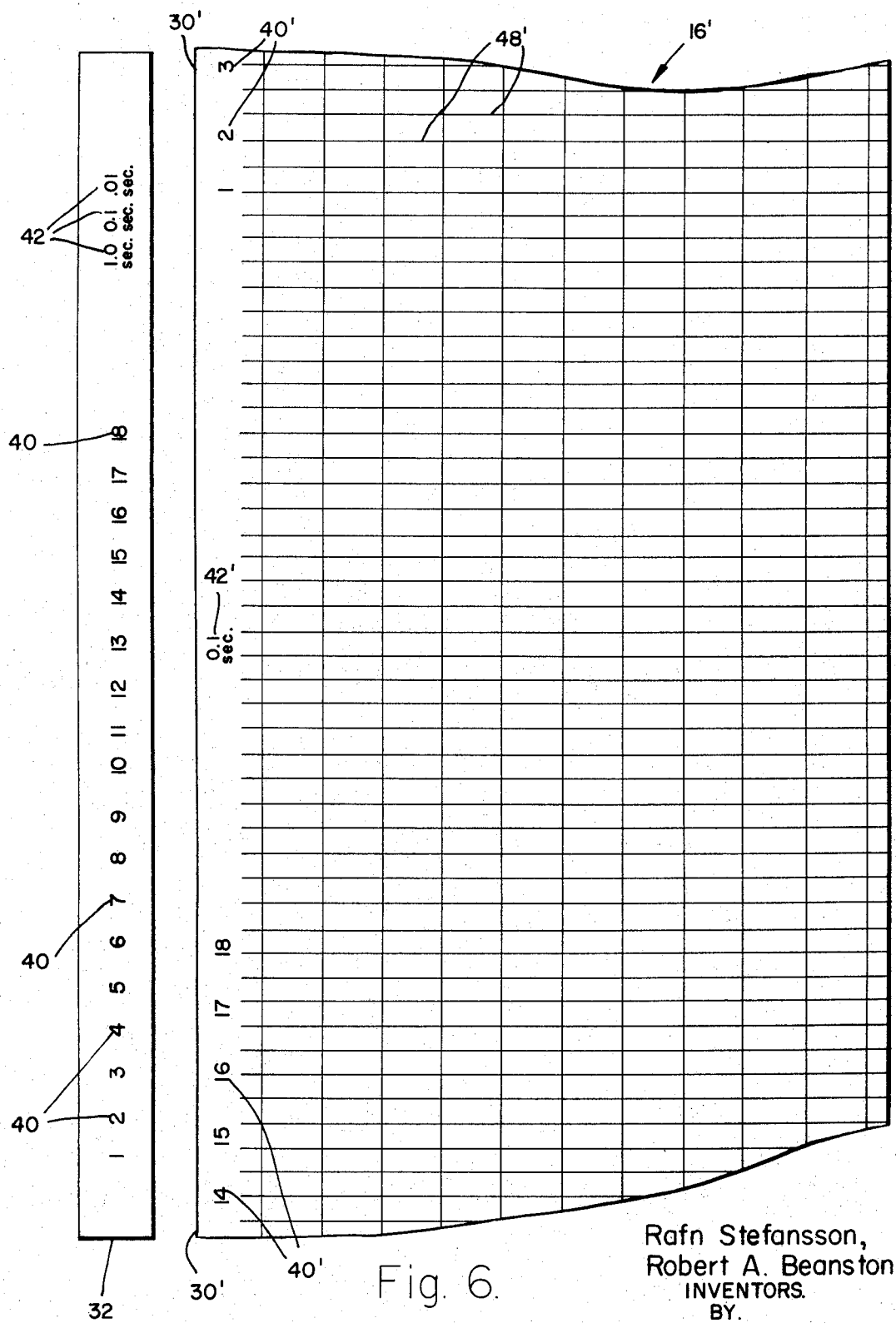
FIG. 2 is an elevation view of a galvanometer trace identification film strip modified to include indicia corresponding to time intervals between timing lines.
FIG. 6 is a plan view of a length of oscillograph record paper on which an indicium corresponding to the time interval between successive timing lines has been printed.

The opaque film strip 32 is shown extended in FIG. 2, and includes a plurality of transparent numerals 40 (such as 1 through 18 shown thereon, for identifiably distinguishing among as many as eighteen galvanometer traces when used, for example, in combination with the galvanometer light beam interrupter arrangement taught in U.S. Pat. No. 3,081,458).

In accordance with one feature of the present invention, the film strip 32 includes transparent indicia 42 corresponding to various adjustments in an operative condition of the oscillograph. In a preferred configuration, the transparent indicia 42 shown in FIG. 2 ("1.0 SEC," "0.1 SEC," and ".01 SEC") correspond to various time intervals between recordable timing lines. Returning to FIG. 1, timing lines can be recorded on the oscillograph paper by such known means as a timing lamp 44 which can be controlled to flash at selected rates by suitable timing rate control means 45, such as a multi-position switch. The light flashes can be reflected by a strip mirror 46 for ultimately exposing timing lines 48 onto the moving photosensitive paper 16.

The circled film strip 32 is rotatably driven about the shaft 36, by the paper drive motor 20 (by means of first and second motor-driven gears 50, 52, in turn driving pulley 54, belt 56 and pulley 38). As the film strip 32 is driven, the galvanometer trace numerals 40 and the timing line indicia 42 are sequentially positioned into the light path of a light projection system for causing images thereof to be projected adjacent to the edge 30 of the moving paper 16.

The light projection system can include an aperture 58 in the housing 60 of the light source 12, directing light rays 62 toward a collecting lens 64. The light rays 62 are thereupon reflected by a mirror 66 through a transparent trace numeral 40 or a transparent timing line indicium 42 if then situated in the light path, in which event an image thereof is projected onto the paper 16 by a focusing lens 68.

The present invention further includes interrupter means 70, driven in synchronism with the rotation of the film strip 32, for interrupting the light rays 62 when transparent timing line indicia 42 not corresponding to the selected timing interval are interposed in the light path, but does not interrupt the light path when a transparent trace numeral 40 or the timing line indicium 42 corresponding to the selected timing interval is interposed in the light path. The phase relationship between the driven interrupter means 70 and the driven film strip 32 is adjusted by phase adjuster means 72, which in turn is responsively connected to the timing rate control means 45, so that the projected one of the timing line indicia 42 corresponds to the selected setting of the timing control means 45.

Figure 3:
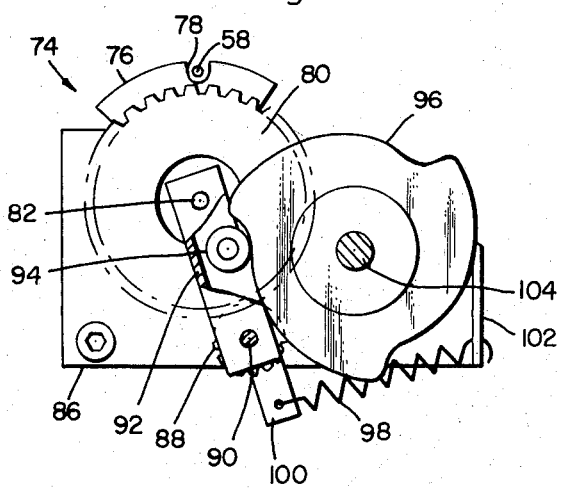
FIG. 3 is a front elevation view, partially cut away, of a shutter assembly included in the preferred embodiment of the present invention shown in block form in FIG. 1.
Figure 4:
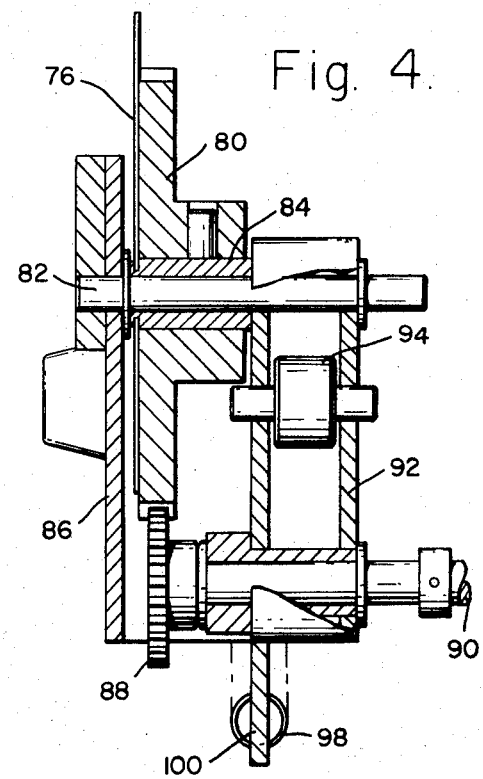
FIG. 4 is a side sectional view of the shutter assembly shown in FIG. 3.

The interrupter means 70 and its interrelation with the phase adjuster means 72 are shown in greater detail in FIGS. 3 and 4, and are best described with concurrent reference to FIGS. 3 and 4 and with occasional reference to FIG. 1.

The interrupter means 70 comprises a shutter arrangement 74 which, in the preferred configuration, includes an arcuate shutter blade 76 having a shutter aperture 78 therein. The shutter blade 76 is fixedly mounted upon a spur gear 80 and extending thereover as shown in FIG. 3, for being rotatably driven about a pin 82 through a bushing 84. The pin 82 is attached to a mounting plate 86 which is mounted to the lamp housing 60 (FIG. 1) such that the shutter blade 76 is caused to pass its full arc length over the lamp housing aperture 58, and the shutter aperture 78 over the housing aperture 58, once each revolution of the shutter blade 76.

The spur gear 80 is rotatably driven by a pinion gear 88 which in turn is driven by the paper drive motor 20 (FIG. 1) through the first and second motor driven gears 50, 52 and a flexible shaft 90. The pinion gear 88 is rotatably mounted near one end of a generally U-shaped support arm 92, the other end of which is rotatably mounted to the pin 82.

A cam follower roller 94 is rotatably supported between the legs of the generally U-shaped support arm 92, and the orientation of the support arm 92 is determined by the rotational position of a cam 96, the cam follower roller 94 being forced against the cam 96 by such biasing means as a spring 98 attached between a leg extension 100 of the support arm 92 and a flange portion 102 of the mounting plate 86.

The cam 96 is rotatably drivable to assume a number of stationary positions with respect to the cam follower roller 94, by such means as an output shaft 104 of a rotary solenoid 106 (FIG. 1). The solenoid 106 is actuated by the timing control 45, in accordance with the selection of time interval between timing lamp flashes (and hence the time interval between the printed timing lines 48). The cam 96 is designed such that its various stationary positions, as controlled by the rotary solenoid 106, cause the cam follower roller 94 to rotationally displace the center of the pinion gear 88 by predetermined amounts about the pin 82. The spur gear 80 is correspondingly displaced about the pin 82 which in turn causes the shutter aperture 78 to be similarly displaced. In such manner, the phase relation between the rotating shutter blade 76 and the rotating film strip 32 is adjusted such that the shutter aperture 78 passes in front of the lamp housing aperture 58 at the same time that a timing line indicia 42 corresponding to the selected timing control setting is interposed between the mirror 66 and focusing lens 68 (FIG. 1) for projection onto moving paper 16.

Figure 5:
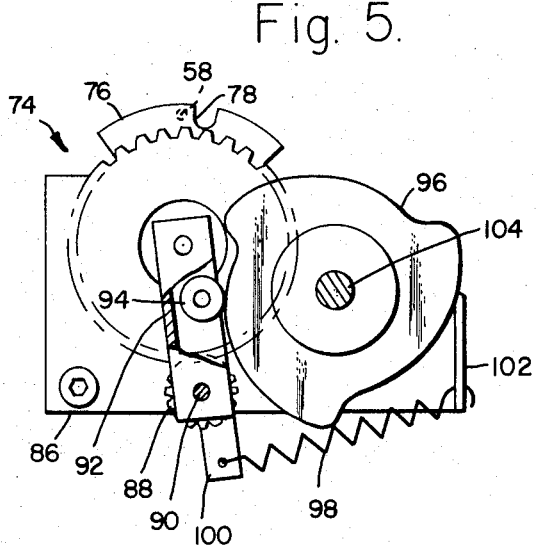
FIG. 5 is a front elevation view of the shutter assembly shown in FIG. 3 but having a different phase adjustment.

Such an adjustment in the phase relation between rotating shutter blade 76 and the rotating film strip 32 is indicated in FIG. 5. The cam 76 has been actuated one position in the clockwise direction to move the shutter blade 76 such that the shutter aperture 78 is in correspondence with the lamp housing aperture 58 when the timing indicium 42, corresponding to selected timing line interval, is interposed in projection light path.

The rotating shutter blade 76 is represented in FIG. 5 at an instant in time (with respect to a cycle or revolution of the rotating film strip) corresponding to that of the rotating shutter blade 76 represented in FIG. 3. The shutter aperture 78 in FIG. 3 is in correspondence with the housing aperture 58—permitting a one of the indicia 42 of the film strip to be projected onto the oscillograph paper—whereas (if the shutter blade 76 is rotating in a clockwise direction) the shutter aperture 76 in FIG. 5 has already been in correspondence with the housing aperture 58 and is now one indicia position removed therefrom, so a different one of indicia 42 on the film strip has already been printed on the oscillograph paper.

The arcuate length of the shutter blade 76 is determined in consideration of the length of the film strip portion which is to "coincide" with the shutter blade's passage over the housing aperture 58 during each revolution of both shutter blade 76 and film strip 32, in accordance with fundamental geometric principles. Accordingly, no more than one of the indicia 42 will be projected during a cycle while the others are "blanked" by the shutter, although all of the trace identification numerals 40 will be projected onto the oscillograph paper.

For use with the film strip 32 shown in FIG. 2, it is apparent that the solenoid-cam combination 106, 96 must have at least three stationary positions, for producing correspondence of the apertures 78, 58 in respective time coincidence with the three indicia 42 shown. An additional position can be provided if it is desired that all indicia 42 be blanked during a cycle, in which case the arcuate shutter blade 76 will be of sufficient length to permit correspondence of the apertures 76, 58 when an opaque portion of the film strip 32 is in the light path, the rotating shutter blade 76 blanking all of the indicia 42.

Turning to FIG. 6, a length of processed oscillograph record paper 16' has printed thereon a plurality of horizontal timing lines 48' which are successively separated by a distance determined by the paper speed and the time interval between flashes of the timing lamp 44 (FIG. 1). In accordance with the results obtained upon operation of the apparatus of the present invention, as described, a printed notation "0.1 SEC" appears adjacent to an edge 30' of the paper 16', which indicates the interval between times that successive timing lines 48' were recorded.

Also shown printed adjacent the edge 30' of the paper 16' are numerals 40', for identifying the various oscillograms (not shown) for example in accordance with the teachings of U.S. Pat. No. 3,081,458. By use of the timing line identification system of the present invention, a timing line interval indicium 42' is printed between each complete series of printed trace numerals 40' (1 through 18). In one operative example of the present system, a timing indicium 42' is printed on the paper every 12 inches of paper length.

Thus, there has been shown a preferred embodiment of apparatus in a recording oscillograph for automatically recording on an oscillograph paper (simultaneously with the galvanometer trace recordings) a printed indication of a selected control setting of an adjustable operative condition of the oscillograph. The preferred record identification system, as described, produces a printed indication of a timing interval between received timing lines, although printed indications of the control settings of other operative conditions of the oscillograph can be obtained in accordance with the teachings of the present invention.

Similarly, means other than the controlled shutter arrangement 70, 72 (FIG. 1) can be utilized for controlling the times when light from the source 12 is projected along the light path to coincide with the interposition of the selected one of the indicia 42 in the light path. For example, a light source can be employed which is caused to flash when a selected indicium 42 is in the light path, and whic h is controlled for this purpose by a suitable light control means which in turn is operatively coupled to the means driving the opaque member and the timing rate control means 45.

Still other embodiments of the present invention, and modifications of the embodiments herein presented, may be developed without departing from essential characteristics thereof. Accordingly, the invention should be limited only by the scope of the claims listed below.

What is claimed is:

1. In a recording oscillograph including drive means for moving a record medium and further including control means having a plurality of control settings for selectively controlling an operative condition of the oscillograph, apparatus for providing a record on the medium indicative of a selected control setting, comprising the combination of:
    application means operatively connected to the drive means for applying indicia indicative of the control settings on the moving record medium;
    interrupter means operatively connected to the drive means for interrupting the application of all but one of said indicia; and
    means responsively connected to the control means for synchronizing said interrupter means with said application means such that said one of said indicia is indicative of the selected control setting.

2. In a recording oscillograph including means for moving a record medium having a photosensitive surface and further including condition control means having a plurality of control settings for selectively controlling an operative condition of the oscillograph, apparatus for providing a record on the medium indicative of a selected control setting, comprising the combination of:
    light means for projecting light along a light path onto the moving medium adjacent to an edge thereof;
    an opaque member including a plurality of serially arranged transparent indicia;
    drive means for driving said opaque member such that said transparent indicia are sequentially interposed in the light path for recording images thereof on the moving medium; and
    light control means operatively coupled to said drive means and to the condition control means, for controlling the times when light from said light means is projected along the light path to coincide with the interposition in the light path of a one of said indicia corresponding to the selected control setting.

3. In a recording oscillograph including drive means for moving a record medium having a photosensitive surface and further including timing line means for recording timing lines on the moving surface at selectible rates, apparatus for providing a record on the medium for identifying a selected rate, comprising in combination:
    light means for projecting light along a light path onto the moving surface adjacent an edge thereof;
    an opaque member having a plurality of transparent indicia including timing line indicia respectively indicative of the selectible rates;
    means ope ratively coupled to the drive means for sequentially interposing said transparent indicia in the light path;
    shutter means operatively coupled to the drive means and synchronizible with the sequential interposition in the light path of said indicia, for interrupting the light along the light path when a one of said timing line indicia not indicative of the selected rate is interposed in the light path.

4. The apparatus in accordance with claim 3 including means actuable by the selectible timing line means in response to a selection of a different one of said rates, for adjusting said shutter means in relation to the sequential interposition in the light path of said indicia such that said shutter means interrupts the light along the light path when a one of said timing line indicia not indicative of the different selected rate is interposed in the light path.

5. In a recording oscillograph including drive means for moving a record medium having a photosensitive surface, apparatus comprising the combination of:
    a lamp for providing light along a light path;
    an opaque member including first and second pluralities of serially arranged transparent indicia;
    means operatively coupled to the drive means for sequentially interposing said indicia in the light path;
    optical means for projecting images of said indicia onto the photosensitive medium adjacent an edge thereof when said indicia are interposed in the light along the light path; and shutter means operatively coupled to the drive means and synchronizible with the interposition of a selected one of said indicia of said second plurality, for interrupting the light path when an unselected one of said indicia of said second plurality is interposed in the light path.

6. In a recording oscillograph including drive means for moving a record medium having a photosensitive surface and further including control means having a plurality of control settings for selectively controlling an operative condition of the oscillograph, apparatus for providing a record on the medium indicative of a selected control setting, comprising the combination of:

a light source for providing light along a light path;

an opaque member including a plurality of transparent indicia respectively indicative of the control settings;

opaque member drive means operatively coupled to the medium drive means for driving said opaque member such that said indicia are cyclically interposed in the light path at respectively different times;

optical means for receiving the light and projecting images of said indicia onto the record medium when said indicia are interposed in the light path;

shutter means operatively synchronous with said opaque member drive means, for cyclically interrupting the light along the light path at all but one of said times; and phase adjuster means responsively coupled to the control means for adjusting the phase relationship between said shutter means and said opaque member drive means such that a one of said indicia indicative of the selected control setting is interposed in the light path at said one of said times.

* * * * *